US012493664B2

(12) United States Patent
Zhang et al.

(10) Patent No.: US 12,493,664 B2
(45) Date of Patent: Dec. 9, 2025

(54) ADDRESSING DATA SCARCITY IN EARLY-CYCLE ANNUAL SOFTWARE SERVICES

(71) Applicant: Intuit Inc., Mountain View, CA (US)

(72) Inventors: Jingyuan Zhang, San Jose, CA (US); Shankar Sankararaman, Burlingame, CA (US); Apurva Swarnakar, Chicago, IL (US); Pragya Tripathi, Oakland, CA (US)

(73) Assignee: Intuit Inc., Mountain View, CA (US)

( * ) Notice: Subject to any disclaimer, the term of this patent is extended or adjusted under 35 U.S.C. 154(b) by 66 days.

(21) Appl. No.: 18/620,576

(22) Filed: Mar. 28, 2024

(65) Prior Publication Data

US 2025/0307325 A1    Oct. 2, 2025

(51) Int. Cl.
  *G06F 16/9535*   (2019.01)
  *G06N 20/00*   (2019.01)
  *H04L 9/40*   (2022.01)

(52) U.S. Cl.
  CPC ......... *G06F 16/9535* (2019.01); *G06N 20/00* (2019.01); *H04L 63/08* (2013.01)

(58) Field of Classification Search
  CPC ..... G06F 16/9535; G06F 7/023; G06N 20/00; H04L 63/08; H04L 41/16; H04N 21/251; H04N 21/466; H04N 21/45; H04N 21/4662
  See application file for complete search history.

(56) References Cited

U.S. PATENT DOCUMENTS

| | | | |
|---|---|---|---|
| 10,373,716 B2* | 8/2019 | Vleugels | A61B 5/4875 |
| 10,650,045 B2* | 5/2020 | Bequet | G06N 3/084 |
| 2009/0292743 A1* | 11/2009 | Bigus | G06F 21/316 |
| 2014/0074269 A1* | 3/2014 | Weston | G06Q 30/0282 |
| | | | 700/94 |
| 2018/0375886 A1* | 12/2018 | Kirti | H04L 67/10 |
| 2019/0260742 A1* | 8/2019 | Arora | H04W 12/65 |
| 2023/0106416 A1* | 4/2023 | Gupte | G06F 16/288 |
| | | | 706/45 |

* cited by examiner

*Primary Examiner* — Michael Won
(74) *Attorney, Agent, or Firm* — Dinsmore & Shohl LLP (57) ABSTRACT

Certain aspects of the disclosure provide a method for training a machine-learning model for predicting content recommendations. The method may include obtaining multi-year training data associated with the software subscription service, the multi-year training data comprising features and content relevance labels for pre-authentication activities and post-authentication activities; filtering the multi-year training data based on a timestamp associated with a respective content relevance label of the content relevance labels such that each respective content relevance label is associated with features having timestamps occurring at or before a timestamp of the respective content relevance label; and training a machine-learning model using the filtered multi-year training data to predict content recommendations based on an aggregated multi-year feature set, wherein the aggregated multi-year feature set includes features extracted from current year pre-authentication activities and post-authentication activities aggregated with historical features extracted from pre-authentication activities and post-authentication activities from prior years.

20 Claims, 7 Drawing Sheets

| VisitorID | AuthID | Time Stamp | Visitor_PY_Features | Visitor_PPY_Features | ... | Auth_PY_Features | Auth_PPY_Features | ... | Lables_PY |
|---|---|---|---|---|---|---|---|---|---|
| V123 | A456 | 1001 | [1, 0.5, ...] | [3, 5, ...] | ... | [4, 8, ...] | [2, 5, ...] | ... | 1 |
| V456 | NA | 1201 | [2, 0.8, ...] | [8, 9, ...] | ... | NA | NA | ... | 0 |
| NA | A123 | 1020 | NA | NA | ... | [2, 0, ...] | [9, 3, ...] | ... | 1 |

304

| VisitorID | AuthID | Time Stamp | Visitor_CY_Features | Visitor_PCY_Features | ... | Auth_CY_Features | Auth_PCY_Features | ... |
|---|---|---|---|---|---|---|---|---|
| V123 | A456 | 5001 | [1, 0.5, ...] | [3, 5, ...] | ... | [4, 8, ...] | [2, 5, ...] | ... |
| V456 | NA | 5012 | [2, 0.8, ...] | [8, 9, ...] | ... | NA | NA | ... |
| NA | A123 | 5015 | NA | NA | ... | [2, 0, ...] | [9, 3, ...] | ... |

ADDRESSING DATA SCARCITY IN EARLY-CYCLE ANNUAL SOFTWARE SERVICES

BACKGROUND

Field

Aspects of the present disclosure relate to machine learning personalization throughout successive Software-as-a-Service (SaaS) subscription cycles.

Description of Related Art

SaaS providers face personalization challenges during launches of new yearly SaaS subscription cycles. A SaaS subscription cycle refers to the annual period or timeline associated with the use of a SaaS product tied to a recurring contract or period of time. As a non-limiting example, a tax preparation and filing SaaS may align its primary subscription cycle to the January 1 to April 15 tax season timespan each year. During this period, most user activity occurs as users import tax documents, complete interview questions, file returns, and utilize complementary financial planning tools. As the subscription cycle progresses, user activity can be tracked, reflecting the interactions of the user with various content items provided by the SaaS platform. Upon conclusion of the cycle year, much of the user data resets with reduced user activity for the SaaS product until the next SaaS subscription cycle.

When the following year SaaS subscription renews, a new subscription cycle starts. Early phases of each subscription cycle tend to exhibit cold start dynamics with limited current user data. Limited user data hinders training machine-learning models to recommend content to users. That is, conventional recommendation systems rely heavily on collaborative filtering which uses the similarity of user behavior and content ratings to suggest new content recommendations. Hybrid methods combine collaborative signals with additional contextual cues, such as content recency and content sequencing. However, these approaches rely on accumulating substantial user interaction data across many users and content items before they can accurately model preferences and make recommendations suited to individual user interests. The absence of sufficient amounts of data early in the SaaS subscription cycle lead to failure of personalizing content effectively.

SUMMARY

Certain aspects provide a method for training a machine-learning model for predicting content recommendations in an early cycle of a software subscription service. In some examples, the method comprises: obtaining multi-year training data associated with the software subscription service, the multi-year training data comprising features and content relevance labels for pre-authentication activities and post-authentication activities; filtering the multi-year training data based on a timestamp associated with a respective content relevance label of the content relevance labels such that each respective content relevance label is associated with features having timestamps occurring at or before a timestamp of the respective content relevance label; and training a machine-learning model using the filtered multi-year training data to predict content recommendations based on an aggregated multi-year feature set, wherein the aggregated multi-year feature set includes features extracted from current year pre-authentication activities and post-authentication activities aggregated with historical features extracted from pre-authentication activities and post-authentication activities from prior years.

Certain aspects provide a method for generating content recommendations in an early cycle of a software subscription service. In some examples, the method comprises: aggregating (i) real-time features extracted from current year pre-authentication activities and post-authentication activities with (ii) historical features extracted from pre-authentication activities and post-authentication activities from prior years to generate an aggregated multi-year feature set, wherein the pre-authentication activities comprise clickstream data collected from visitor interactions with one or more websites and the post-authentication activities comprise user interactions with the software subscription service associated with an authenticated user account; and providing the aggregated multi-year feature set to a trained machine-learning model to predict content recommendations based on the aggregated multi-year feature set, wherein the trained machine-learning model is trained on training data including: multi-year training data associated with the software subscription service, the multi-year training data comprising features and content relevance labels for pre-authentication activities and post-authentication activities; filtered multi-year training data associated with the software subscription service, the multi-year training data comprising features and content relevance labels for pre-authentication activities and post-authentication activities and filtered based on a timestamp associated with a respective content relevance label of the content relevance labels such that each respective content relevance label is associated with features having timestamps occurring at or before a timestamp of the respective content relevance label; and predicting content recommendations based on the aggregated multi-year feature set.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for ensuring the continuity of machine-learning enhanced personalization throughout successive SaaS subscription cycles, despite data scarcity.

SaaS platforms face the recurring challenge of limited user data availability during each new subscription cycle. Absent sufficient data on current user behaviors and interests, conventional machine-learning content recommendation techniques fail to personalize early user experiences. For example, consider an online tax preparation and filing service that follows an annual subscription model tied to U.S. tax seasons from January-April 15th each year. During most of 2022, users actively use the service to file their 2021 returns. User behavior information can be logged all year; such information may include tax forms accessed, income questions answered, refund options selected, etc. This user behavior information can then be provided to machine-learning models that recommended helpful relevant articles and product upgrade options personalized to each user.

However, come January 2023, when users return for the new tax year, very little 2023 user data reflecting current interests or tax situations upon which to make accurate content suggestions are available, as the users may have just logged in for the first time since filing their previous tax return. Accordingly, some users see numerous irritating recommendations, like upgrading self-employed services when they are W-2 employees. Such generalized untailored suggestions based on outdated, or default preferences, cause frustrations early in each SaaS subscription cycle before machine-learning models have obtained enough user data to re-personalize content recommendations. However, simply using the prior year's 2022 data as a starting point quickly becomes insufficient, as user needs and interests can change significantly between cycles—a W2 employee may switch jobs or start a side business requiring different tools. While the 2022 data provides a useful baseline, continuously adapting to the most recent signals from the new 2023 cycle is critical. However, months of poor content relevance can impact subscriber satisfaction and renewal rates for year 2024. Thus, in accordance with examples of the present disclosure, systems and methods to mitigate such data scarcity issues through a multi-year machine-learning training approach are described. This balances leveraging insights from previous cycles while rapidly adjusting to reflect the latest data each year. By proactively addressing early cycle data limitations, subscriber satisfaction and loyalty can be maintained at a high level throughout the subscription timeline.

To address the cold start and data scarcity issues found at the start of recurring cyclical intervals, such as SaaS subscription cycles, examples of the present disclosure utilize a multi-year machine-learning training approach. More specifically, historical user behaviors covering multiple prior cycles can be aggregated into one or more labeled datasets. For example, by collecting engagement feedback and downstream user usage signals tied to specific personalized recommendations for previous cycles, ground truth labels can indicate content relevancy. User specific click/event data can be obtained that captures each user's long-term interests across cycles. Machine-learning models can be trained on such multi-cycle training data to recognize individual user preferences and extrapolate them to new content prediction scenarios. Accordingly, despite starting with limited current cycle data, personalized content ranking and/or other customizations can be reflected in content presented to a user, even for newly onboarded users. Trained machine-learning models can be retrained and/or fine-tuned as user usage data becomes available each cycle.

As described above, techniques disclosed herein are directed to using multi-cycle data to address cold start issues for recurring cyclical systems such as SaaS platforms. Such techniques provide a technical solution to the problem of insufficient personalized recommendations early in cycles due to limited data to effectively train recommendation models. The aggregation of user behaviors and relevance patterns across prior cycles can be used to train machine-learning models that can suggest personalized content, despite minimal data about current user interests or needs. This improves upon conventional content recommendation models that require large amounts of recent user event data to operate accurately. Further, user activity data prior to authentication can be mapped to post-authentication user identifiers to retain user information across cycle resets and transitions. The techniques described herein, therefore, advance recurring system personalization by mitigating cyclic cold start issues where models lack sufficient data to generate tailored recommendations each new cycle.

Example System for Obtaining Multi-Year Training Data

Figure 1:
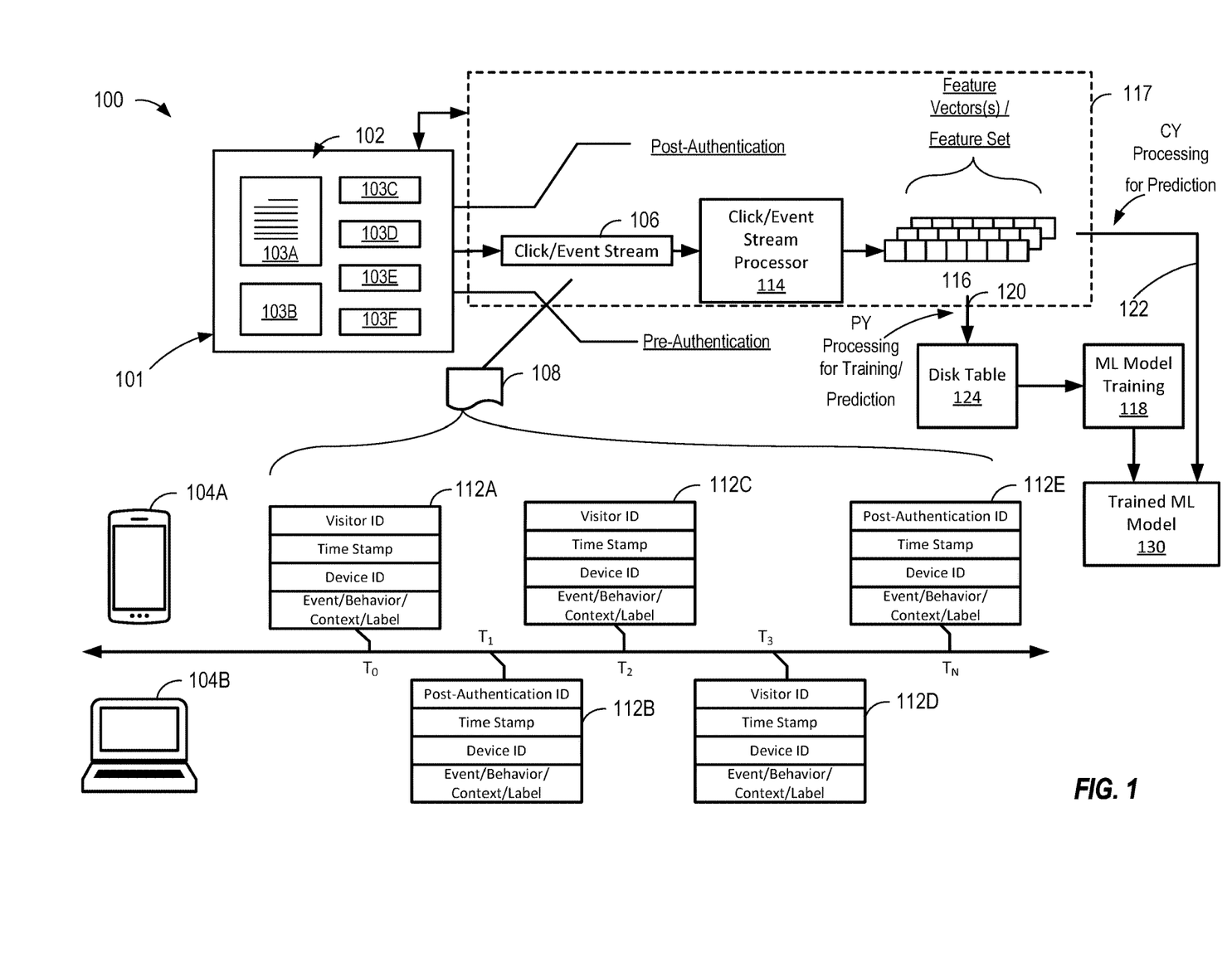
FIG. 1 depicts a system for obtaining multi-year training data associated with a SaaS platform in accordance with examples of the present disclosure.

FIG. 1 depicts a system 100 for obtaining multi-year training data associated with a SaaS platform 101 in accordance with examples of the present disclosure. The SaaS platform 101 may be a cloud-based scalable software solution offering personalized, graphical user interfaces and access to a variety of services and tools, designed to enhance productivity and collaboration for users. In examples, the SaaS platform 101 may be configured to dynamically display personalized and recommended content, tailored to the preferences and historical interactions of one or more users, via a graphical user interface 102, as a user navigates various content items 103A-103F of the SaaS platform 101. That is, the content items 103A-103F may include various personalized content options that are displayed to users during interactions with the SaaS platform 101. Alternatively, or in addition, the content items 103A-103F may include various personalized content options that are candidates to be recommended to users during interactions with the SaaS platform 101. The content items 103A-103F can include on-screen graphical recommendations and/or underlying processing to retrieve and render appropriate text, media, document, and application content to a client.

For example, in an implementation of the system 100 directed to a tax preparation software subscription service, the content items 103A-103F can include graphical interface elements prompting personalized product or document recommendations during an information gathering session, where the personalized product or document recommendations may be based on a user's tax situation, inferred, or otherwise. As another example, content times 103A-103F may also include logic to retrieve and populate a specific interview question sequence tailored to a user's self-employment status if detected, or a tax filing status. Alternatively, or in addition, content items 103A-103F may include logic for retrieving and formatting appropriate tax advice articles for a user as the user navigates the SaaS platform 101. The various graphical, text, media, and logical software elements provide personalized content that the SaaS platform 101 can cause to be displayed to a user.

In examples, multiple data features can be tracked and associated with each content item 103A-103F. These data features describe properties such as, but not limited to, historical user click propensities for content, variability of interest over SaaS subscription cycles, and topical relevance of recent content visits. The data features can quantify aspects of personalized history with each content option as well as changes in user viewing trends. By leveraging these historical data features, data can be provided to a machine-learning model 118 to accurately score and rank one or more content items, such as content items 103A-103F, as a personalized recommendation for a user.

In an example, the user devices 104A and 104B, which are example user smartphone and computer devices respectively, may be used by a user to interact with the graphical user interface 102 of the SaaS platform 101. In examples, a click/event stream 106 comprises visitor and user activity tracked by the system 100 across various user devices 104A-104B, including page visits, content clicks, and other events. This activity data can be logged as one or more records in log 108. In examples, a computing host or computing platform 117 may be responsible for collecting the click/event stream 106, processing the click/event stream 106, and providing the processed click/event stream 106 as feature vector(s) or a feature set 116 for training a machine-learning model 118 and/or predicting content using the trained machine-learning model 130.

As previously discussed, the click/event stream 106 may include a recorded history of user interactions and behaviors tracked by the system 100. In one example, tracking can be implemented using embedded JavaScript snippets or beacons within site pages and applications, configurable representational state transfer (REST) application programming interface (API) event calls sent by $1^{st}$-party applications, as well as integration with 3rd party analytics services. Thus, the system 100 can collect event streams across different user experiences and products, such as but not limited to SaaS applications. The techniques described could be applied to personalization and recommendation engines for non-SaaS scenarios as well, including websites, mobile applications, internet-of-things (IoT) devices, and more. The cyclic nature of user data availability poses similar cold start challenges across many different systems that interface with users on a recurring basis over time. By generalizing the description to focus on the temporal data collection and modeling challenges, the disclosed methods can be applicable more broadly beyond just SaaS use cases. As users use smartphones (e.g., example user devices 104A), computing device 104B, and/or other devices to interact with the SaaS platform 101, whether authenticated or anonymously browsing, click/event stream 106 can log detailed records, including but not limited to, page visits, button clicks, searches, content recommendations displayed and clicked, interview questions answered, and/or documents processed. Each event record (e.g., 112) can contain a client identifier such as cookie-backed visitor ID, an event timestamp (e.g., $T_0$, $T_1$, $T_2$, $T_3$, $T_N$), an event type classification, a referrer context, as well as event-specific metadata, such as but not limited to recommended content ID or search query strings. Additional pre-processing of click/event stream 106 data can include stitching user sessions together across multiple devices, as well as mapping anonymous pre-authentication visitor IDs to post-authenticated user IDs on the basis of common fingerprints, such as but not limited to, IP address, geolocation, and browser session signatures. The click/event stream 106 allows the system 100 to obtain information about each user's cumulative experience over time and across login state changes, even when switching between various smartphones (e.g., example user devices 104A) and computing devices 104B that may be used to access the SaaS platform 101.

Additional elements may characterize certain categories of event records 112A-112F. For example, some event records may capture: interview responses from users filling out multi-page tax questionnaires that facilitate product recommendations; document processing logs detailing any errors encountered while handling consumer files; mortgage statements submitted by users; and various company filings uploaded to the system. Note that while the baseline event records 112A-112E share common attributes like timestamps, client IDs etc., the event-specific contextual data can vary across records. For instance, a web form submission event may include different metadata compared to a 3rd party API call to display an advertisement or retrieve additional user data.

The click/event stream processor 114 processes click/event stream 106 to extract per-user features that summarize user-tracked activity over specified time intervals. The aggregated features can be output as feature vectors or a feature set 116. That is, the click/event stream processor 114 analyzes the incoming real-time click/event stream 106 to generate summarized per-user feature vectors per configurable time intervals, for example, hourly, daily, weekly, monthly, etc. The click/event stream processor 114 can consume the click/event stream 106 ordered by event time for tracking chronological sequences. Features can be vectorized by the click/event stream processor 114 and can include statistics aggregated over periods of interest, such as counts of content categories visited by a visitor before registering for or creating an account.

In some examples, temporal features, such as but not limited to, mean time spent reviewing a displayed recommended document before dismissal vs click approval, can also be generated by the click/event stream processor 114. Sequential behavior features also consider the order of actions within viewing sessions or along a timeline. For example, rapidly iterating search queries followed by a long article read could signal research mode interest. Together, these user-oriented event features encoded within click/event stream 106 can be extracted by the click/event stream processor 114 and can be used to characterize each visitor or user. By extracting and summarizing these features, the system 100 can obtain data to train a machine-learning model 118 and/or to generate predictions about recommended content using the trained machine-learning model 130.

For example, to train a machine-learning model 118, a data processing pipeline 120 can obtain visitor and authentication event data from prior SaaS subscription cycles relative to a current SaaS subscription cycle. For example, if the current SaaS subscription cycle year is 2023, data processing pipeline 120 can gather clickstream and user profile data for prior SaaS subscription cycle years 2022, 2021, 2020—extending back multiple prior years. The data processing pipeline 120 can extract user specific features summarizing prior SaaS subscription cycle data in batches; such batches can include aggregated visitor features and authentication features that are then stored on or otherwise accessible via fixed on-disk tables to enable efficient data retrieval.

In contrast, when generating real-time content recommendations for a current SaaS subscription cycle (e.g., 2023), a separate data processing pipeline 122 is used to process streaming click and event data. In examples, data processing pipeline 122 can maintain a buffer window of recent user interactions or events, processing them through feature extractors to generate feature vector(s) or a feature set 116 for each user. In some examples, unlike the aggregated visitor features and authentication features that are stored on or otherwise accessible via fixed on-disk tables and used primarily for training, the features and feature vectors for the current SaaS subscription cycle year can be updated with event data based on recent visitor click data.

The data processing pipeline 120 can obtain visitor identity tracking information before a user authenticates and user profile information after a user authenticates; such information can be gathered historically over many SaaS subscription cycle years. Likewise, the data processing pipeline 122 can obtain visitor identity tracking information before a user authenticates and user profile information after a user authenticates; such information can be gathered for a current SaaS subscription cycle year. That is, initially, as visitors browse without logging in, their actions can be anonymously tracked using for example, cookies that record their clicks and interactions. This data is stored over multiple SaaS subscription cycles (in the case of the data processing pipeline 120), creating a historical record of visitor behavior. Once a user logs in, the system 100 links this anonymous visitor data to their authenticated user profile. This means that all the activities they performed before logging in can be associated with their known user identity. This approach allows the system 100 to maintain a continuous analysis of user behavior, providing valuable insights that many traditional analytics tools lose during the transition from visitor to logged-in user.

That is, pre-authentication visitor data refers to, for example, behavioral clickstream, journey, and engagement metrics gathered while a user is anonymously interacting with the SaaS platform 101 prior to supplying credentials to login or register an account. Examples include browsing website page content, using site search tools, or partially completing multi-stage interview questions to determine tax product fits. Pre-authentication tracking leverages browser cookies storing a visitor ID to link site interactions to the same guest or anonymous user across sessions. Once the visitor creates a registered account in the SaaS platform 101, the mapping of the pre-authentication visitor ID to a newly assigned authenticated user ID occurs as part of the login-tracking event. The user ID can then persist over future post-authentication events versus the transient per-session visitor ID used before authentication.

Pre-authentication patterns can help identify early content recommendation signals despite lacking specific user identity details that emerge later after authentication. For example, anonymously trying alternative interview question paths may indicate with high confidence, that a subsequent paid account may be created. Pre-authentication user journeys, or sequences, also establish baseline site interactions to better contextualize when a user diverges during post-authentication actions in their authenticated account state.

By bridging both pre-authentication visitor data and post-authentication user data into consolidated profiles, system 100 mitigates cold start issues that typically do not include behavioral information lost during conventional tracking across login state changes. Maintaining continuity in user modeling and personalization improves accuracy by aligning insights from visitors with insights obtained from clients.

In addition to user features, the system 100 also obtains training labels that serve as ground truth information on the actual relevance or utility of content items (e.g., 103A-103F) for users in past SaaS subscription cycle years. Specifically, the data processing pipeline 120 can aggregate signals, such as but not limited to, positive engagements, conversions, and downstream usage patterns, when users interact with or are served certain content items (e.g., 112A-112F). Thus, the data processing pipeline 120 can construct datasets that associate feature sets with labels indicating the appropriateness of content recommendations for those users. These datasets become training examples for training the machine-learning model 118 to identify patterns in feature data associated with positive or negative outcomes for generating personalized content recommendations.

Figure 3:
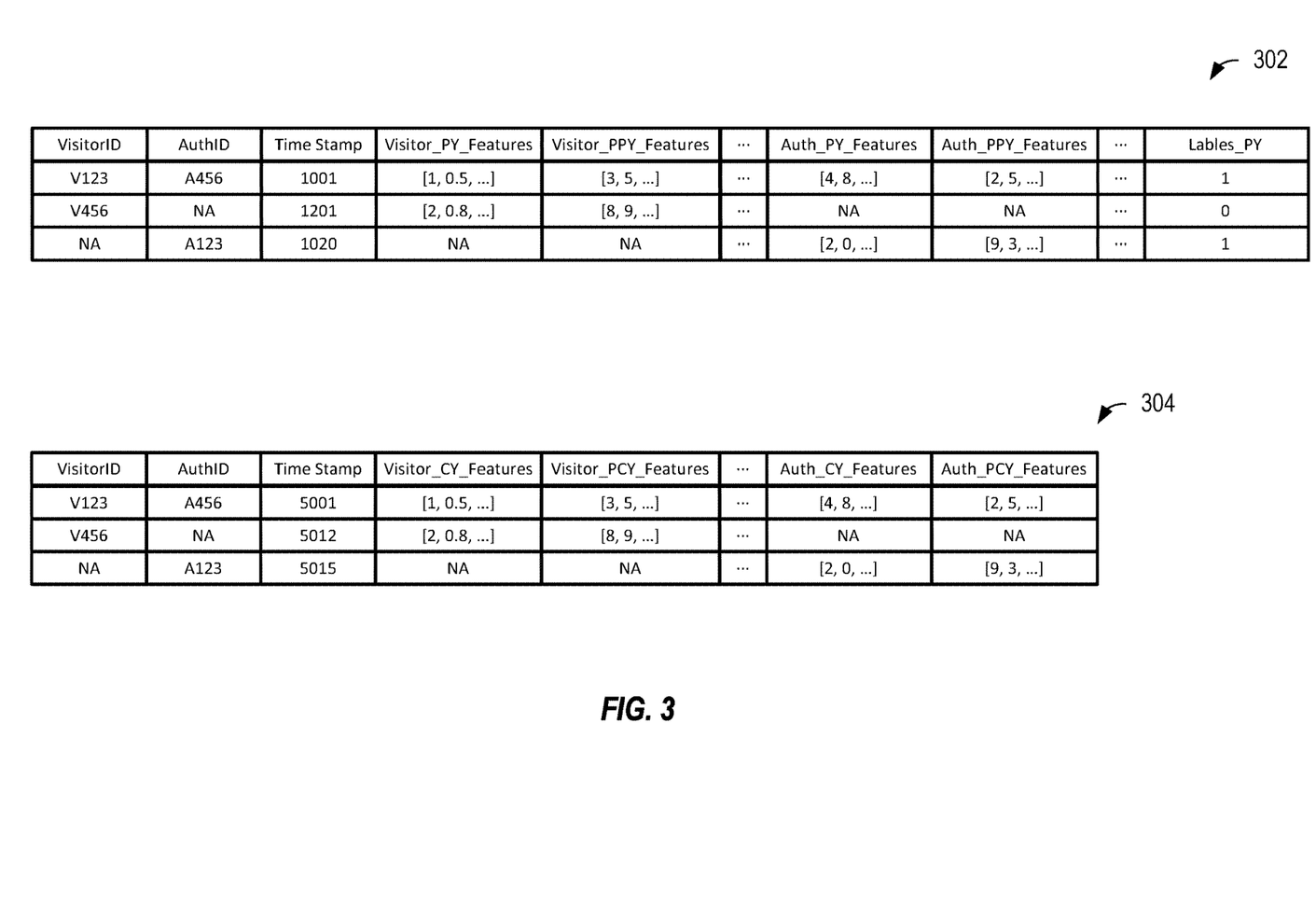
FIG. 3 depicts example data structures that provide data storage and retrieval of user features for machine-learning model training and content recommendations over multiple SaaS subscription cycles in accordance with examples of the present disclosure.

In some examples, disk tables 124 can be utilized to provide low latency feature vector lookup based on visitor ID or user ID. Disk tables 124 can leverage storage formats on disks for efficient scanning and retrieval during model scoring batches. As depicted in FIG. 3, column groups can represent feature sets for different time intervals such as per day or week. Rows store individual feature vectors for each user ID, keyed for direct retrieval by user ID.

Figure 2A:
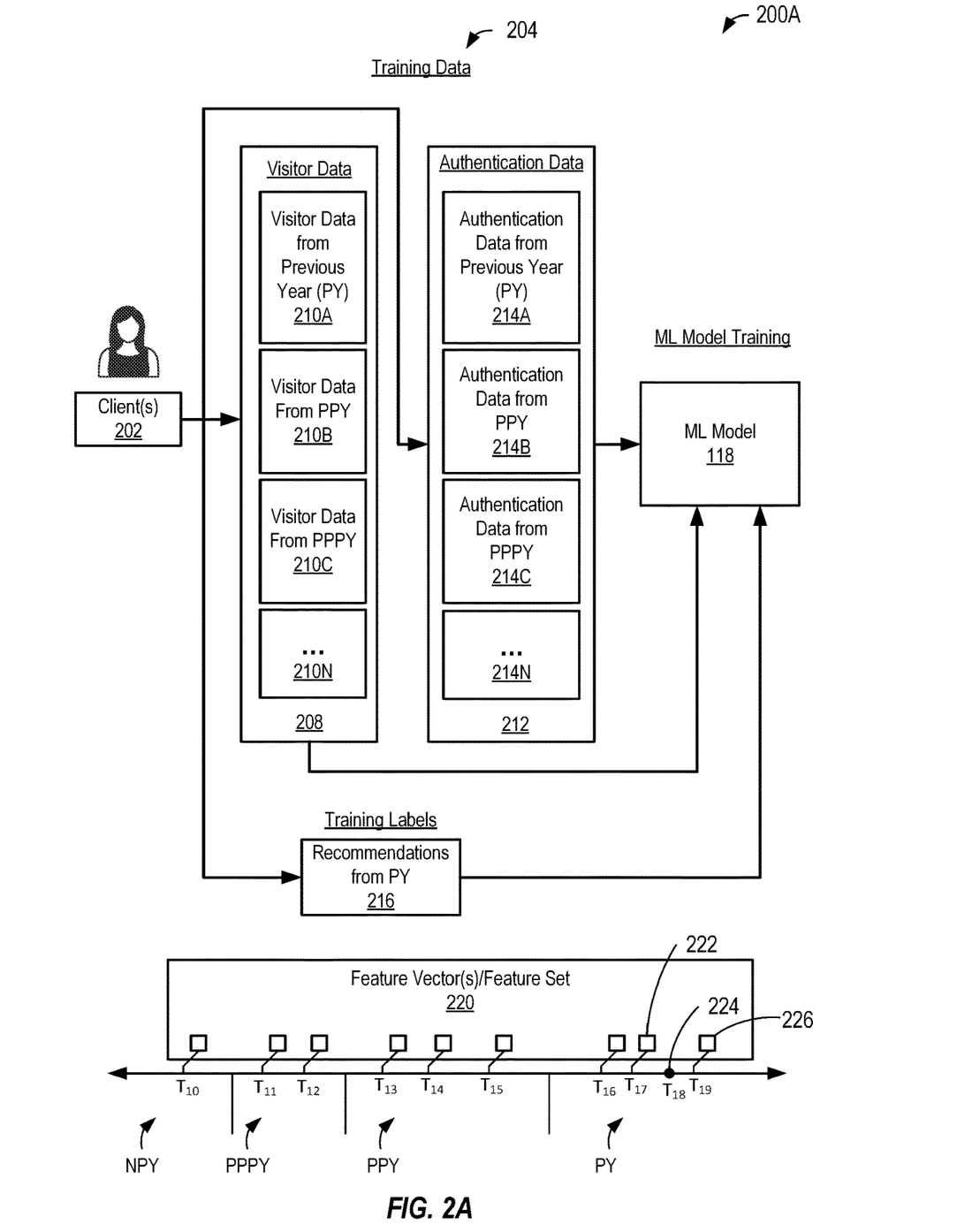
FIG. 2A depicts a diagram for obtaining multi-year training data associated with the system for purposes of training a machine-learning model in accordance with examples of the present disclosure.

Example for Obtaining Multi-Year Training Data and Predicting Content Based on the Multi-Year Training Data FIG. 2A depicts a diagram 200A for obtaining multi-year training data 204 associated with the system 100 for purposes of training a machine-learning model 118. More specifically, the system 100 aggregates authentication data 212 and visitor data 208 from current and previous SaaS subscription cycles relative to a current SaaS subscription cycle year into multi-year training data 204 that serves as input to train the machine-learning model 118. For example, in a current SaaS subscription cycle year denoted CY (e.g., year 2023), the data processing pipeline 120 can obtain visitor data 210A and authentication data 214A from a prior SaaS subscription cycle year denoted PY (e.g., year 2022). The data processing pipeline 120 can obtain visitor data 210B-210N and authentication data 214B-214N from a set of previous SaaS subscription cycle years (e.g., PPY (Prior to the Prior Year, e.g., two years ago) for year 2021 and PPPY (Prior to the Prior to the Prior year, e.g., three years ago) for year 2020 and, in some cases years before PPPY).

In some implementations, the data processing pipeline 120 can associate labels, ground truths, or recommendations 216 with one or more of visitor data 208, authentication data 212, or combinations thereof. The recommendations 216 indicate specific content items served to users in prior SaaS subscription cycles based on user interaction patterns, along with measured outcomes like engagement depth or conversion to a paid account. By way of an example, sample feature vector/feature set 220 illustrates feature aggregations for a specific visitor ID during previous SaaS subscription cycle years (PY, PPY, PPPY, and/or a number of prior years (NPY)). For the feature vector/feature set 220, one or more features corresponding to clicks/events occurring at timestamps $T_{10}$-$T_{17}$ and $T_{19}$ are collected via the system 100. The label 224, occurring at a timestamp $T_{18}$, is treated as a training label for content recommendations based on the click/events occurring before $T_{18}$. That is, the set of values, or features, that represent characteristics or attributes associated with click/events 222 that occur before timestamp $T_{18}$, could be associated with the label 224 and used as training data to train the machine-learning model 118. As the set of values, or features, that represent characteristics or attributes associated with the click/event 226 occur after timestamp $T_{18}$ (e.g., at $T_{19}$), the set of values, or features, that represent characteristics or attributes associated with the click/event 226 is not included as training data associated with the label 224. This filtering based on label timestamp ensures that only user behaviors prior to the label are incorporated into the feature vector provided for model training.

That is, click/event data (e.g., T17-T10) for the previous SaaS subscription cycles having a timestamp that is equal to, or immediately less than the timestamp (e.g., T18) at which the label 224 was obtained, can be collected and associated with the label 224 for use as training data. Accordingly, the system 100 avoids data leakage by ensuring that the machine-learning model 118, which can include transformer-based models like BERT® or GPT-3®, or other neural network architectures such as convolutional neural networks (CNNs) or recurrent neural networks (RNNs), evaluation during training simulates true prospective recommendations at each timestamp rather than incorporating future unseen data (e.g., 226). The models are trained to optimize a loss function such as binary cross-entropy for classification tasks or mean squared error for regression tasks. Aggregating multiple prior SaaS subscription cycles provides training data while not including current SaaS subscription cycle data. Further, the click/event data (e.g., T17-T10) for the previous SaaS subscription cycles comprises click/event data that for pre-authentication click/events and/or post-authentication click/events.

Data used for training the machine-learning model can be stored on disk, as shown in disk table 124 (e.g., the on-disk database table) (FIG. 1) and further described with respect to FIG. 3. This allows for efficient retrieval of the historical data during a model-training process. Moreover, as discussed earlier, the timestamp of the generated labels (e.g., label 224) is considered when extracting features for training. By limiting training data to click/event data with timestamps occurring before the label's timestamp, no future information is included in the training process, maintaining the integrity of the machine-learning model 118 (e.g. by avoiding leakage). Additionally, since model training can be performed offline, latency is not a major concern during the model training process. Rather, aggregating sufficient historical data from multiple prior SaaS subscription cycles is used to create a comprehensive training dataset.

Figure 2B:
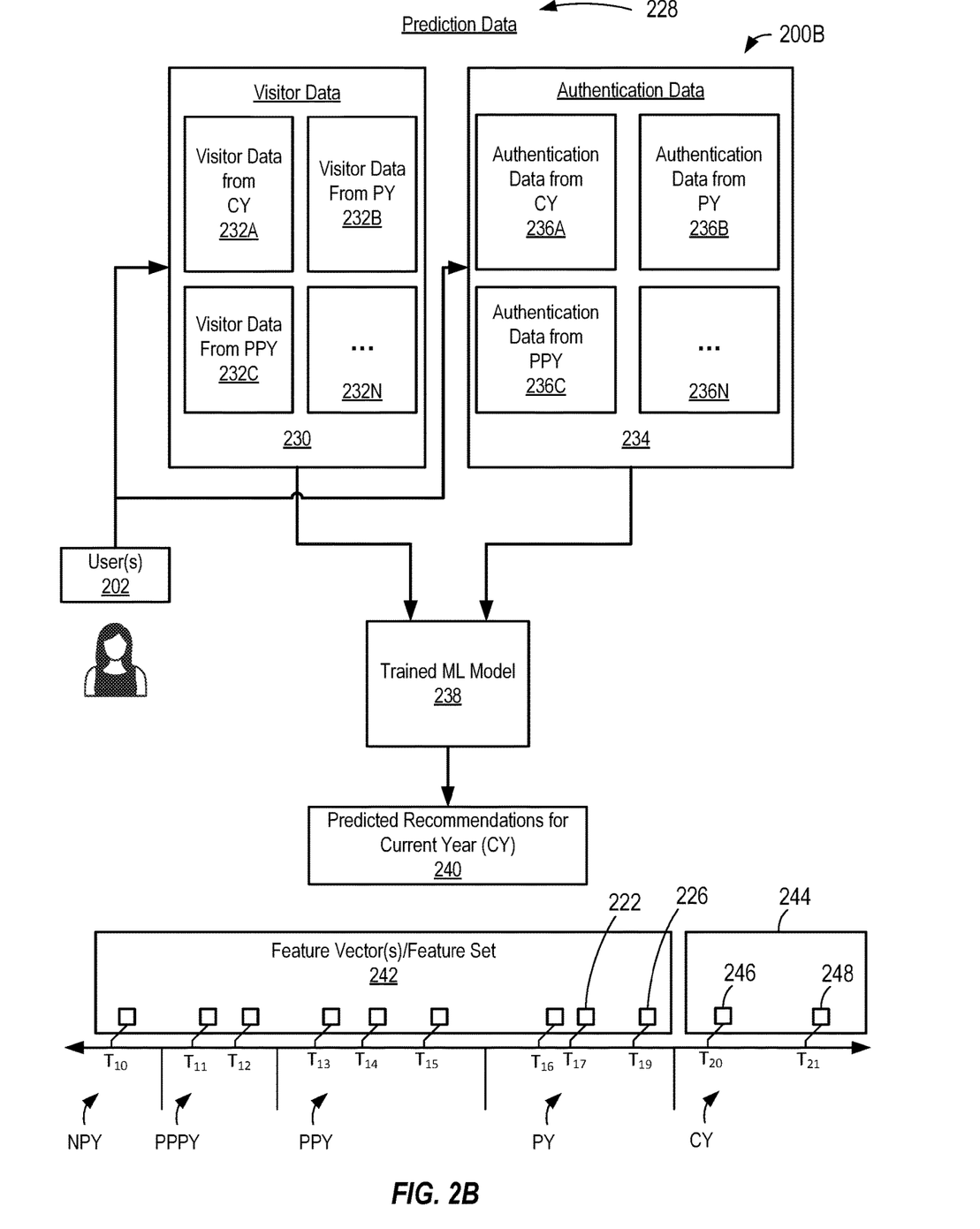
FIG. 2B depicts a diagram illustrating a prediction phase using a trained machine-learning model to generate content recommendations personalized for individual users during a SaaS subscription cycle year in accordance with examples of the present disclosure.

FIG. 2B depicts a diagram 200B illustrating a prediction phase using a trained machine-learning model 238, which is the trained machine-learning model 130, to generate content recommendations 240 personalized for individual users 202 during a SaaS subscription cycle year, such as CY 2023 based on prediction data 228. More specifically, the trained machine-learning model 238 underwent prior training on training data (e.g., label 224 and click/event data (e.g., T17-T10) for the previous SaaS subscription cycles having a timestamp that is equal to, or immediately less than the timestamp (e.g., T18) at which the label 224 was obtained) to identify patterns predicting engagement with certain content items. In examples, to avoid creating separate feature sets for multiple prior SaaS subscription cycle years (PYs, PPYs, etc.), pre-computed information (e.g., feature vector(s)/feature set(s) 242) from previous years can be aggregated and stored into on-disk database tables that store historical click/event data. In examples, such information can be stored, for example as binary data, indexed by one or more database fields, such as a visitor ID key for pre-authentication activities and user ID keys for post-authentication activities. Accordingly, retrieval operations involving numerous disjointed feature sources that would otherwise introduce high latency during real-time inferences can be avoided.

Thus, for example, the data processing pipeline 122 of FIG. 1 can handle real-time clickstreams and events from user devices as anonymous visitors access the SaaS platform 101. The data processing pipeline 122 can construct feature vector(s)/feature set(s) 244 that include click/event data (e.g., 246) for a current SaaS subscription cycle year as well as real-time and/or near-real time click/event data (e.g., 248). As depicted in FIG. 2B, content recommendations 240 personalized for individual users 202 can be based on visitor data 230 including visitor data from previous SaaS subscription cycle years 232B, 232C, 232N, as well as a current SaaS subscription cycle year 232A. In addition, the content recommendations 240 personalized for individual users 202 can be based on authentication data 234 including authentication data from previous SaaS subscription cycle years 236B, 236C, 236N, as well as a current SaaS subscription cycle year 236A.

As illustrated in FIG. 2B, utilizing prediction data 228 to generate predicted content recommendations 240 for CY relies on the streaming data pipeline (e.g., data processing pipeline 122 in FIG. 1) to collect and process current year data. This streaming pipeline can ensure that the most up-to-date user interactions and behaviors are captured and used to generate personalized recommendations. By continuously ingesting and analyzing real-time clickstreams and events, the system can adapt to the user's evolving interests and preferences throughout the current subscription cycle. On the other hand, historical data from previous subscription cycles is stored on disk in advance, as shown in the disk table 124 (of FIG. 1) and further described in FIG. 3. This allows for efficient retrieval of the pre-aggregated historical features during the inference process, reducing the latency associated with accessing large amounts of data. Latency optimization is a factor in a real-time, or near real-time, inference phase, as users generally expect quick and responsive recommendations based on their latest interactions with a SaaS platform. By leveraging the combination of real-time streaming data and efficiently stored historical data, the system can generate personalized content recommendations in a timely manner.

Example Data Structures

FIG. 3 depicts example data structures 302 and 304 that provide data storage and retrieval of user features for machine-learning model training and content recommendations over multiple SaaS subscription cycles in accordance with examples of the present disclosure. In examples, the data structure 302 is an example data structure directed to training data for training the machine-learning model 118. As depicted by the data structure 302, some information may not be available during data collection (e.g., data processing pipeline 120) and therefore some data fields may be empty. For example, user 202 may visit a SaaS platform 101 but never authenticate. In this way, the post-authentication features are not applicable for this user. Similarly, a user may authenticate to the SaaS platform 101 upon a first visit. Accordingly, the visitor-level pre-authentication features may not be applicable or available for this user.

The data structure 304 is an example data structure for use when performing an inference operation, by machine-learning model 238 for example, to predict content recommendations (e.g., 240). As depicted in FIG. 3, because the predicted labels have yet to be predicted, such labels are not included in the data structure 304. Thus, data for the current SaaS cycle year may include click/event information having a timestamp that is before a requested prediction timestamp while the previous SaaS cycle year may include click/event information for the entire previous SaaS cycle year(s). In examples, the rows of data structure 304 store individual multi-year visitor and authentication feature vectors for each user identifier, whether tracking visitors pre-login or users post-authentication. Keyed for direct retrieval by ID (e.g., VisitorID or AuthID), the rows can span both current and previous SaaS subscription cycle years, consolidating profiles from disparate visitor cookies and logged-in accounts using a common unique ID as an index.

Figure 4:
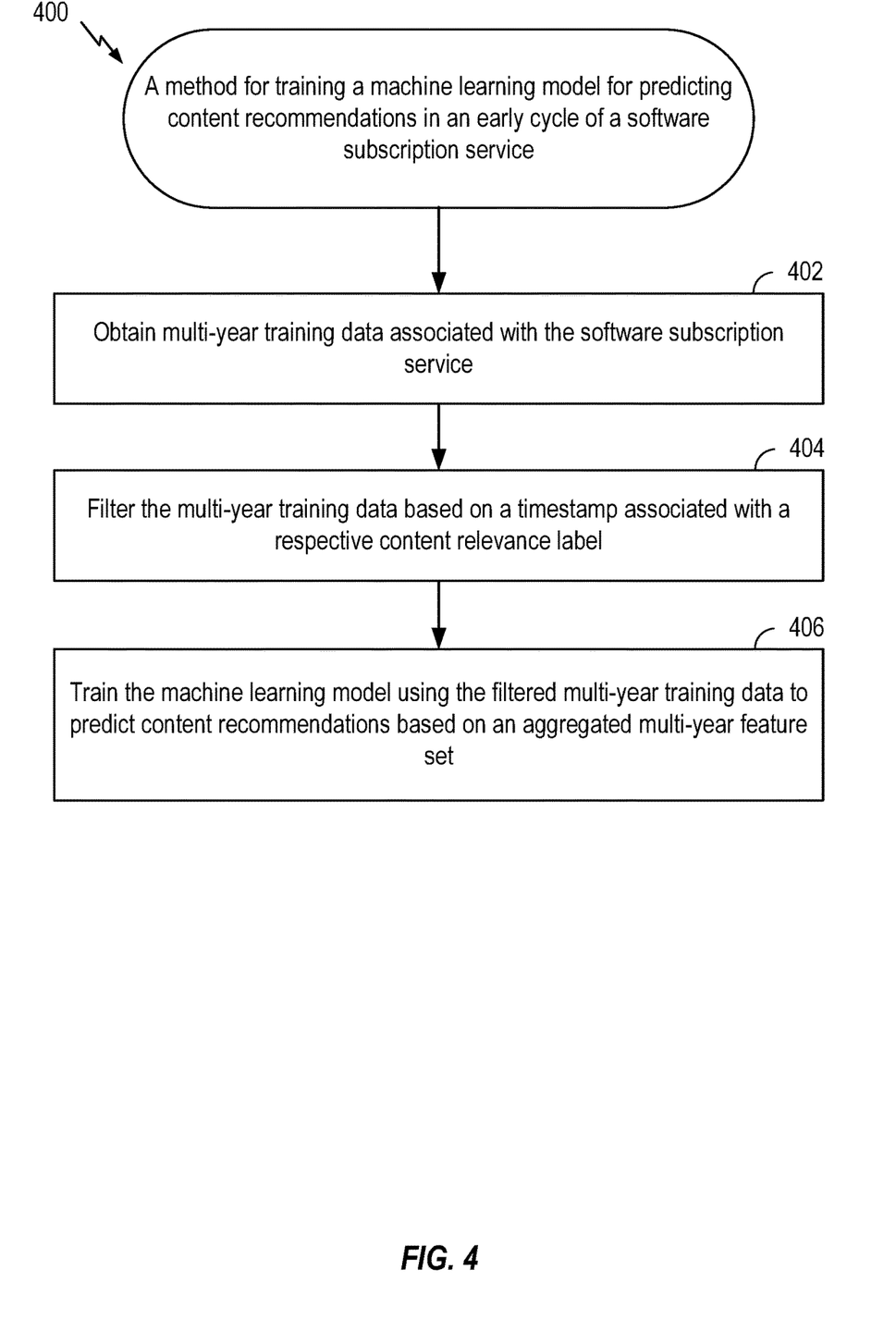
FIG. 4 depicts an example method for training a machine-learning model for predicting content recommendations in an early cycle of a software subscription service.

Example Method for Training a Machine-Learning Model for Predicting Content Recommendations in an Early Cycle of a Software Subscription Service FIG. 4 depicts an example method for training a machine-learning model for predicting content recommendations in an early cycle of a software subscription service. In one aspect, method 400 can be implemented by the system 100 of FIG. 1.

Method 400 starts at block 402 with obtaining multi-year training data associated with the software subscription service. In some embodiments, the multi-year training data comprises features and content relevance labels for pre-authentication activities and post-authentication activities.

The method 400 continues to block 404 with filtering the multi-year training data based on a timestamp associated with a respective content relevance label of the content relevance labels such that each respective content relevance label is associated with features having timestamps occurring at or before a timestamp of the respective content relevance label.

The method 400 continues to block 406 with training a machine-learning model using the filtered multi-year training data to predict content recommendations based on an aggregated multi-year feature set. In some embodiments, the aggregated multi-year feature set includes features extracted from current year pre-authentication activities and post-authentication activities aggregated with historical features extracted from pre-authentication activities and post-authentication activities from prior years.

In some embodiments of method 400, the pre-authentication activities comprise clickstream data collected from visitor interactions with one or more websites.

In some embodiments of method 400, the post-authentication activities comprise user interactions with the software subscription service associated with an authenticated user account.

In some embodiments of method 400, the multi-year training data includes pre-authentication visitor features from multiple visitor identifiers mapped to a single authenticated user identifier.

In some embodiments, the method 400 further comprises storing the multi-year training data in an on-disk database table. This enables efficient retrieval of the pre-aggregated features during model training. However, when generating content recommendations for the current subscription cycle, a separate streaming data pipeline can be used to process real-time user interactions. The streaming data pipeline extracts features from the latest user events and aggregates them with historical features retrieved from the on-disk table to enable the model to make predictions that are personalized based on both past and present user behavior.

In some embodiments, the method 400 further comprises: generating features from multi-year pre-authentication and post-authentication activities; and storing the generated features in the on-disk database table.

In some embodiments of method 400, generating features further comprises: aggregating events from a plurality of visitor identifiers mapping to a single user identifier based on timestamps; and engineering features using aggregated event counts.

In some embodiments, the method 400 further comprises preparing for presentation on a user interface of the software subscription service, the content recommendation predictions.

In some embodiments of method 400, presenting the content recommendations comprises: determining a display position and layout for each recommendation within the user interface; allocating space for recommended content items; and preparing for rendering the recommendations to the allocated spaces upon user access.

In some embodiments of method 400, the content relevance labels for pre-authentication activities and post-authentication activities indicate positive or negative indications of content relevance based on historical observed user behaviors.

In some embodiments of method 400, the historical observed user behaviors comprise clicks or conversions associated with previously presented content.

In some embodiments, the method 400 further comprises discarding training data that lacks both a pre-authentication visitor identifier and post-authentication user identifier associated with a content relevance label.

In some embodiments, the method 400 further comprises segmenting visitor activities and user activities into discrete periods of time comprising at least one of days, weeks, months, or years.

In some embodiments, the method 400 further comprises re-training the machine-learning model using first and second aggregated features, wherein the first aggregated features are based on instances of predicted content relevance being above a confidence threshold, and the second aggregated features are based on instances of predicted content relevance being below the confidence threshold.

In some embodiments, the method 400 further comprises: preprocessing content features to extract semantic embeddings, wherein the preprocessing is performed as a data preparation step prior to training the machine-learning model; utilizing the semantic embeddings as enriched input features for the machine-learning model for identifying related content as additional content predictions; extracting semantic embeddings from content features; and providing the semantic embeddings to the machine-learning model for identifying related content as additional recommendations.

In some embodiments, the method 400 further comprises: preprocessing content features to extract semantic embeddings, wherein the preprocessing is performed as a data preparation step prior to training the machine-learning model; utilizing the semantic embeddings as enriched input features for the machine-learning model for identifying related content as additional content predictions; extracting semantic embeddings from content features; and providing the semantic embeddings to the machine-learning model for identifying related content as additional recommendations. Using semantic embeddings improves the ability of the model to detect semantic similarities and relationships between content items, enabling more accurate recommendations of related content. Additionally, semantic embeddings can reduce the dimensionality of textual features, improving processing efficiency and scalability. Further, semantic embeddings allow generalization to new unseen vocabulary. By capturing conceptual representations, recommendations can be made for content with new words not seen during training. This extends robustly to new cycles with shifting content catalogs.

Note that FIG. 4 is just one example of a method, and other methods including fewer, additional, or alternative steps are possible consistent with this disclosure.

Figure 5:
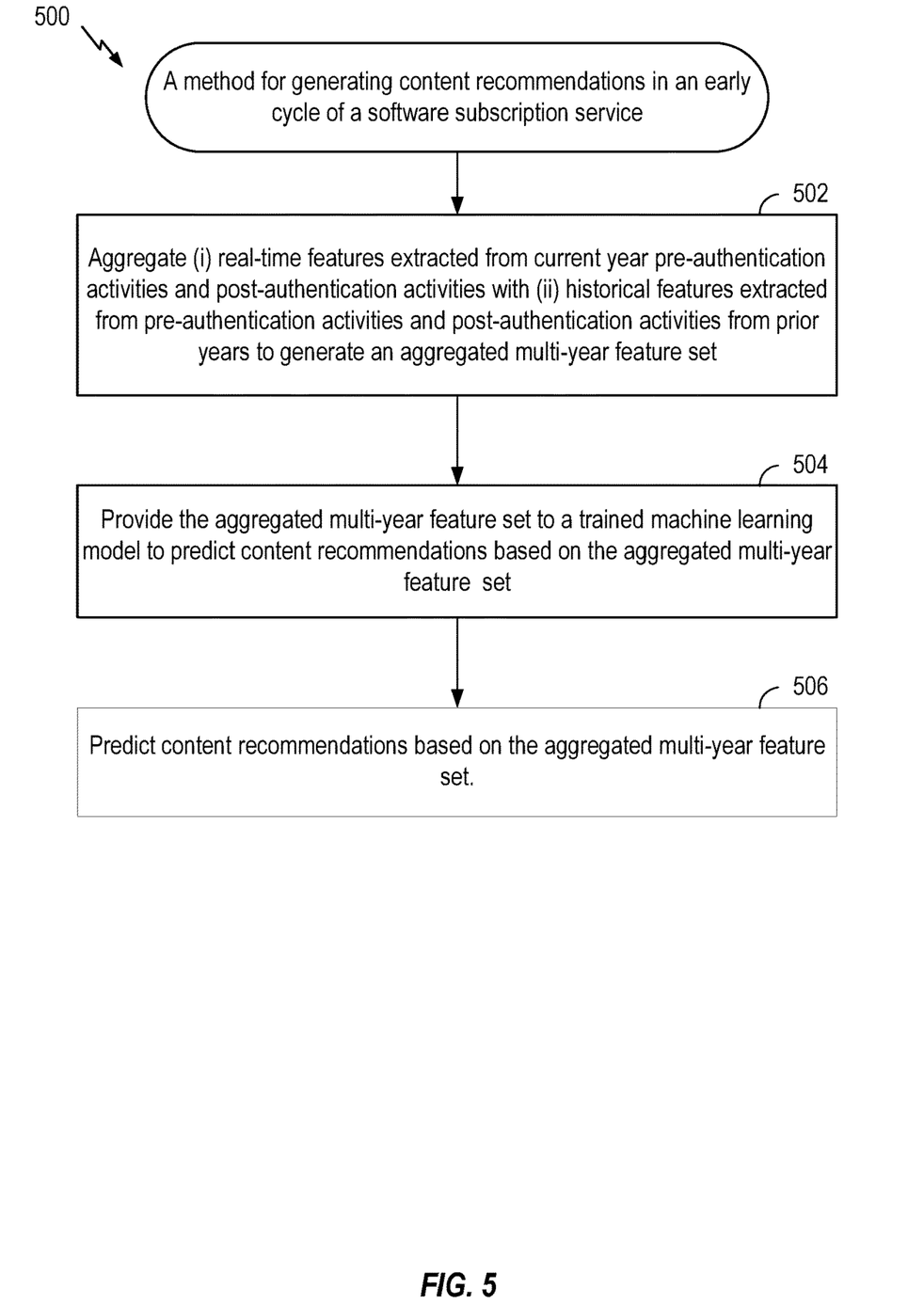
FIG. 5 depicts an example method for generating content recommendations in an early cycle of a software subscription service.

Example Method for Generating Content Recommendations in an Early Cycle of a Software Subscription Service FIG. 5 depicts an example method for generating content recommendations in an early cycle of a software subscription service. In one aspect, method 500 can be implemented by the system 100 of FIG. 1.

Method 500 starts at block 502 with aggregating (i) real-time features extracted from current year pre-authentication activities and post-authentication activities with (ii) historical features extracted from pre-authentication activities and post-authentication activities from prior years to generate an aggregated multi-year feature set. In some embodiments, the pre-authentication activities comprise clickstream data collected from visitor interactions with one or more websites and the post-authentication activities comprise user interactions with the software subscription service associated with an authenticated user account. In some embodiments, the real-time features extracted from current year pre-authentication activities and post-authentication activities are obtained from a streaming processing pipeline, such as data processing pipeline 122. In some embodiments, the historical features extracted from pre-authentication activities and post-authentication activities from prior years are stored on a disk for efficient retrieval. Storing the historical features on disk is an optimization technique that leverages the fact that this data is pre-aggregated and may not change during the prediction phase. This allows for fast retrieval of historical context without introducing latency. Thus, the streaming processing pipeline processes the current year data in real-time, or near real-time, to ensure the most up-to-date user behavior is captured, while the historical data is pre-aggregated and stored on disk to avoid high latency during prediction. The combination of these real-time or near real-time and historical features generates an aggregated multi-year feature set for making personalized recommendations.

Method 500 continues to block 504 with providing the aggregated multi-year feature set to a trained machine-learning model to predict content recommendations based on the aggregated multi-year feature set. In some embodiments, the trained machine-learning model is trained on training data including: multi-year training data associated with the software subscription service, the multi-year training data comprising features and content relevance labels for pre-authentication activities and post-authentication activities; and filtered multi-year training data associated with the software subscription service, the multi-year training data comprising features and content relevance labels for pre-authentication activities and post-authentication activities and filtered based on a timestamp associated with a respective content relevance label of the content relevance labels such that each respective content relevance label is associated with features having timestamps occurring at or before a timestamp of the respective content relevance label.

Method 500 continues to block 506 with predicting content recommendations based on the aggregated multi-year feature set.

In some embodiments of method 500, aggregating the real-time features and the historical features comprises aggregating pre-authentication visitor features from multiple visitor identifiers mapping to a single authenticated user identifier.

In some embodiments, the method 500 further comprises: determining first aggregated features when a predicted content relevance is above a confidence threshold; determining second aggregated features when the predicted content relevance is below the confidence threshold; and causing the trained machine-learning model to be re-trained with the first and second aggregated features.

Note that FIG. 5 is just one example of a method, and other methods including fewer, additional, or alternative steps are possible consistent with this disclosure.

Figure 6:
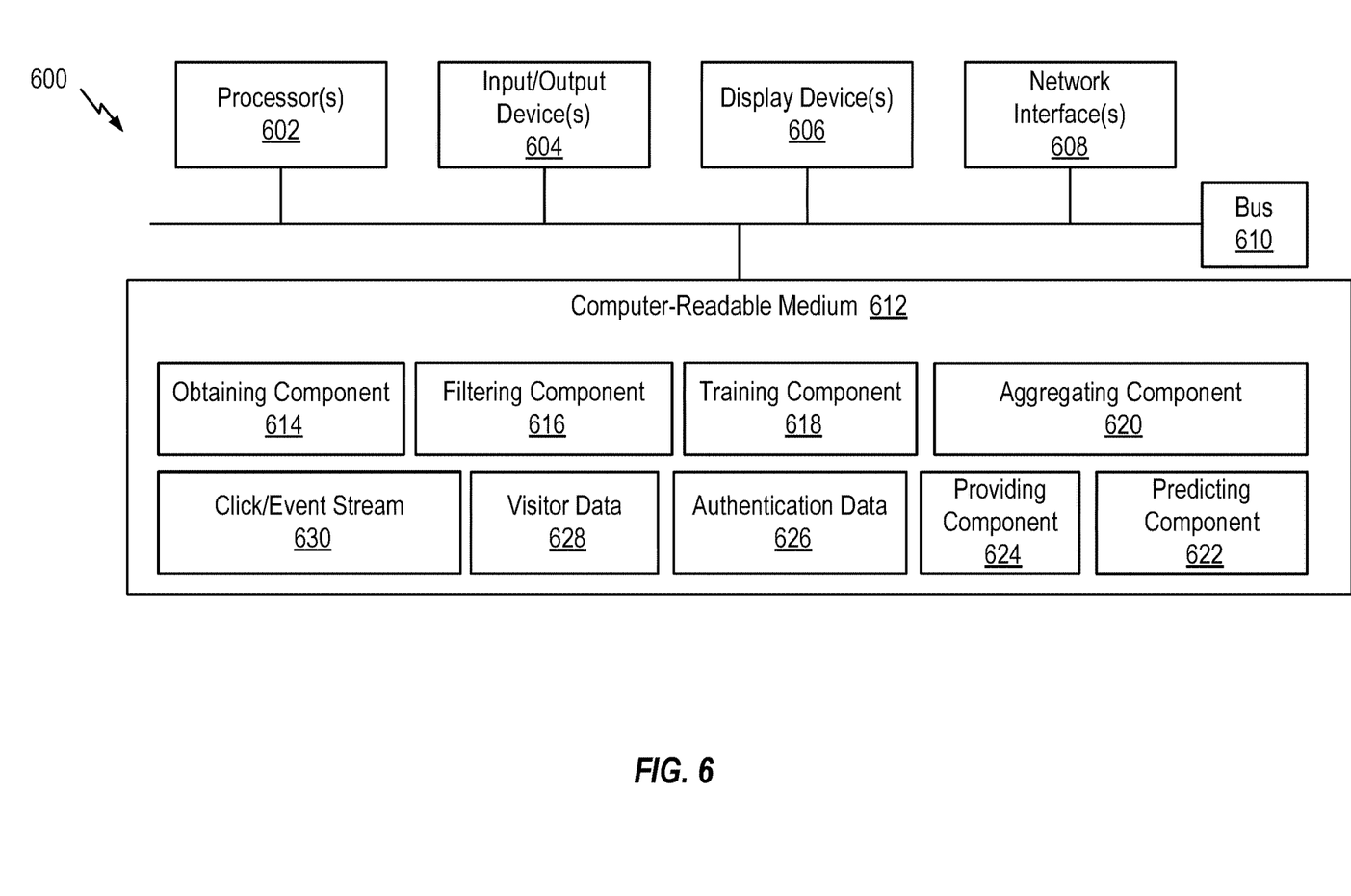
FIG. 6 depicts an example processing system with which aspects of the present disclosure can be performed.

Example Processing System for Training and Using a Machine-Learning Model for Predicting Content Recommendations in an Early Cycle of a Software Subscription Service FIG. 6 depicts an example processing system 600 configured to perform various aspects described herein, including, for example, method 400 as described above with respect to FIG. 4 and method 500 as described above with respect to FIG. 5.

Processing system 600 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 600 includes one or more processors 602, one or more input/output devices 604, one or more display devices 606, one or more network interfaces 608 through which processing system 600 is connected to one or more networks (e.g., a local network, an intranet, the Internet, or any other group of processing systems communicatively connected to each other), and computer-readable medium 612. In the depicted example, the aforementioned components are coupled by a bus 610, which may generally be configured for data exchange amongst the components. Bus 610 may be representative of multiple buses, while only one is depicted for simplicity.

Processor(s) 602 are generally configured to retrieve and execute instructions stored in one or more memories, including local memories like computer-readable medium 612, as well as remote memories and data stores. Similarly, processor(s) 602 are configured to store application data residing in local memories like the computer-readable medium 612, as well as remote memories and data stores. More generally, bus 610 is configured to transmit programming instructions and application data among the processor(s) 602, display device(s) 606, network interface(s) 608, and/or computer-readable medium 612. In certain embodiments, processor(s) 602 are representative of one or more central processing units (CPUs), graphics processing unit (GPUs), tensor processing unit (TPUs), accelerators, and other processing devices.

Input/output device(s) 604 may include any device, mechanism, system, interactive display, and/or various other hardware and software components for communicating information between processing system 600 and a user of processing system 600. For example, input/output device(s) 604 may include input hardware, such as a keyboard, touch screen, button, microphone, speaker, and/or other device for receiving inputs from the user and sending outputs to the user.

Display device(s) 606 may generally include any sort of device configured to display data, information, graphics, user interface elements, and the like to a user. For example, display device(s) 606 may include internal and external displays such as an internal display of a tablet computer or an external display for a server computer or a projector. Display device(s) 606 may further include displays for devices, such as augmented, virtual, and/or extended reality devices. In various embodiments, display device(s) 606 may be configured to display a graphical user interface.

Network interface(s) 608 provide processing system 600 with access to external networks and thereby to external processing systems. Network interface(s) 608 can generally be any hardware and/or software capable of transmitting and/or receiving data via a wired or wireless network connection. Accordingly, network interface(s) 608 can include a communication transceiver for sending and/or receiving any wired and/or wireless communication.

Computer-readable medium 612 may be a volatile memory, such as a random access memory (RAM), or a nonvolatile memory, such as nonvolatile random access memory (NVRAM), or the like. In this example, computer-readable medium 612 includes an obtaining component 614, a filtering component 616, a training component 618, an aggregating component 620, a predicting component 622, and a providing component 624.

In certain embodiments, component 614 is configured to obtain multi-year training data associated with the software subscription service, the multi-year training data comprising features and content relevance labels for pre-authentication activities and post-authentication activities. In examples, the obtaining component 614 can perform one or more functions of the system 100 of FIG. 1. In certain embodiments, filtering component 616 is configured to filter the multi-year training data based on a timestamp associated with a respective content relevance label of the content relevance labels such that each respective content relevance label is associated with features having timestamps occurring at or before a timestamp of the respective content relevance label. In examples, the filtering component 616 can perform one or more functions of the system 100 of FIG. 1, such as the click/event stream processor 114 and/or the data processing pipeline 120 of FIG. 1. In some embodiments, training component 618 is configured to train a machine-learning model using the filtered multi-year training data to predict content recommendations based on an aggregated multi-year feature set, wherein the aggregated multi-year feature set includes features extracted from current year pre-authentication activities and post-authentication activities aggregated with historical features extracted from pre-authentication activities and post-authentication activities from prior years. In examples, the training component 618 can perform one or more functions of training the machine-learning model 118 of FIG. 1 and/or FIG. 2 using one or more of visitor data 628 and/or authentication data 626.

In some embodiments, component 620 is configured to aggregate (i) real-time features extracted from current year pre-authentication activities and post-authentication activities with (ii) historical features extracted from pre-authentication activities and post-authentication activities from prior years to generate an aggregated multi-year feature set, wherein the pre-authentication activities comprise clickstream data collected from visitor interactions with one or more websites and the post-authentication activities comprise user interactions with the software subscription service associated with an authenticated user account. In examples, the aggregating component 620 can perform one or more functions of the system 100 and/or data processing pipeline 122 of FIG. 1 and can be operating on a click/event stream 630. In some embodiments, component 622 is configured to provide the aggregated multi-year feature set to a trained machine-learning model to predict content recommendations based on the aggregated multi-year feature set, wherein the trained machine-learning model is trained on training data including: multi-year training data associated with the software subscription service, the multi-year training data comprising features and content relevance labels for pre-authentication activities and post-authentication activities; and filtered multi-year training data associated with the software subscription service, the multi-year training data comprising features and content relevance labels for pre-authentication activities and post-authentication activities and filtered based on a timestamp associated with a respective content relevance label of the content relevance labels such that each respective content relevance label is associated with features having timestamps occurring at or before a timestamp of the respective content relevance label. In some examples, the providing component 624 is configured to perform one or more functions of the system 100 of FIG. 1, such as the data processing pipeline 122 of FIG. 1. In some embodiments, the component 622 is configured to predict content recommendations based on the aggregated multi-year feature set. In some examples, the predicting component 624 is configured to perform one or more functions of the machine-learning model 238 of FIG. 2.

Note that FIG. 6 is just one example of a processing system consistent with aspects described herein, and other processing systems having additional, alternative, or fewer components are possible consistent with this disclosure.

Example Clauses

Implementation examples are described in the following numbered clauses:

Clause 1: A method for training a machine-learning model for predicting content recommendations in an early cycle of a software subscription service, the method comprising: obtaining multi-year training data associated with the software subscription service, the multi-year training data comprising features and content relevance labels for pre-authentication activities and post-authentication activities; filtering the multi-year training data based on a timestamp associated with a respective content relevance label of the content relevance labels such that each respective content relevance label is associated with features having timestamps occurring at or before the timestamp of the respective content relevance label; and training the machine-learning model using the filtered multi-year training data to predict content recommendations based on an aggregated multi-year feature set, wherein the aggregated multi-year feature set includes features extracted from current year pre-authentication activities and post-authentication activities aggregated with historical features extracted from pre-authentication activities and post-authentication activities from prior years.

Clause 2: A method in accordance with Clause 1, wherein the pre-authentication activities comprise clickstream data collected from visitor interactions with one or more websites.

Clause 3: A method in accordance with any one of Clauses 1-2, wherein the post-authentication activities comprise user interactions with the software subscription service associated with an authenticated user account.

Clause 4: A method in accordance with any one of Clauses 1-3, wherein the multi-year training data includes pre-authentication visitor features from multiple visitor identifiers mapped to a single authenticated user identifier.

Clause 5: A method in accordance with any one of Clauses 1-4, further comprising storing the multi-year training data in an on-disk database table.

Clause 6: A method in accordance with Clause 5, further comprising: generating features from multi-year pre-authentication and post-authentication activities; and storing the generated features in the on-disk database table.

Clause 7: A method in accordance with Clause 6, wherein generating features further comprises: aggregating events from a plurality of visitor identifiers mapping to a single user identifier based on timestamps; and engineering features using aggregated event counts.

Clause 8: A method in accordance with any one of Clauses 1-7, further comprising preparing for presentation on a user interface of the software subscription service, the content recommendation predictions.

Clause 9: A method in accordance with Clause 8, wherein presenting the content recommendations comprises: determining a display position and layout for each recommendation within the user interface; allocating space for recommended content items; and preparing for rendering the recommendations to the allocated spaces upon user access.

Clause 10: A method in accordance with any one of Clauses 1-9, wherein the content relevance labels for pre-authentication activities and post-authentication activities indicate positive or negative indications of content relevance based on historical observed user behaviors.

Clause 11: A method in accordance with Clause 10, wherein the historical observed user behaviors comprise clicks or conversions associated with previously presented content.

Clause 12: A method in accordance with any one of Clauses 1-11, further comprising discarding training data that lacks both a pre-authentication visitor identifier and post-authentication user identifier associated with a content relevance label.

Clause 13: A method in accordance with any one of Clauses 1-12, further comprising segmenting visitor activities and user activities into discrete periods of time comprising at least one of days, weeks, months, or years.

Clause 14: A method in accordance with any one of Clauses 1-13, further comprising re-training the machine-learning model using first and second aggregated features, wherein the first aggregated features are based on instances of predicted content relevance being above a confidence threshold, and the second aggregated features are based on instances of predicted content relevance being below the confidence threshold.

Clause 15: A method in accordance with any one of Clauses 1-14, further comprising: preprocessing content features to extract semantic embeddings, wherein the preprocessing is performed as a data preparation step prior to training the machine-learning model; and utilizing the semantic embeddings as enriched input features for the machine-learning model for identifying related content as additional content predictions; extracting the semantic embeddings from content features; and providing the semantic embeddings to the machine-learning model for identifying related content as additional recommendations.

Clause 16: A method for generating content recommendations in an early cycle of a software subscription service, the method comprising: aggregating (i) real-time features extracted from current year pre-authentication activities and post-authentication activities with (ii) historical features extracted from pre-authentication activities and post-authentication activities from prior years to generate an aggregated multi-year feature set, wherein the current year pre-authentication activities comprise clickstream data collected from visitor interactions with one or more websites and the post-authentication activities comprise user interactions with the software subscription service associated with an authenticated user account; and providing the aggregated multi-year feature set to a trained machine-learning model to predict content recommendations based on the aggregated multi-year feature set, wherein the trained machine-learning model is trained on training data including: multi-year training data associated with the software subscription service, the multi-year training data comprising features and content relevance labels for pre-authentication activities and post-authentication activities; filtered multi-year training data associated with the software subscription service, the multi-year training data comprising features and content relevance labels for pre-authentication activities and post-authentication activities and filtered based on a timestamp associated with a respective content relevance label of the content relevance labels such that each respective content relevance label is associated with features having timestamps occurring at or before a timestamp of the respective content relevance label; and predicting content recommendations based on the aggregated multi-year feature set.

Clause 17: A method in accordance with Clause 16, wherein aggregating the real-time features and the historical features comprises aggregating pre-authentication visitor features from multiple visitor identifiers mapping to a single authenticated user identifier.

Clause 18: A method in accordance with Clause 17, further comprising: determining first aggregated features when a predicted content relevance is above a confidence threshold; determining second aggregated features when the predicted content relevance is below the confidence threshold; and causing the trained machine-learning model to be re-trained with the first and second aggregated features.

Clause 19: A processing system, comprising: a memory comprising computer-executable instructions; and a processor configured to execute the computer-executable instructions and cause the processing system to perform a method in accordance with any one of Clauses 1-18.

Clause 20: A processing system, comprising means for performing a method in accordance with any one of Clauses 1-18.

Clause 21: A non-transitory computer-readable medium storing program code for causing a processing system to perform the steps of any one of Clauses 1-18.

Clause 22: A computer program product embodied on a computer-readable storage medium comprising code for performing a method in accordance with any one of Clauses 1-18.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for training a machine-learning model for predicting content recommendations in an early cycle of a software subscription service, the method comprising:
    obtaining multi-year training data associated with the software subscription service, the multi-year training data comprising features and content relevance labels for pre-authentication activities and post-authentication activities;
    filtering the multi-year training data, to generate filtered multi-year training data, based on a timestamp associated with a respective content relevance label of the content relevance labels such that each respective content relevance label is associated with features having timestamps occurring at or before the timestamp of the respective content relevance label; and
    training the machine-learning model using the filtered multi-year training data to predict content recommendations based on an aggregated multi-year feature set, wherein the aggregated multi-year feature set includes features extracted from current year pre-authentication activities and post-authentication activities aggregated with historical features extracted from pre-authentication activities and post-authentication activities from prior years.

2. The method of claim 1, wherein the pre-authentication activities comprise clickstream data collected from visitor interactions with one or more websites.

3. The method of claim 1, wherein the post-authentication activities comprise user interactions with the software subscription service associated with an authenticated user account.

4. The method of claim 1, wherein the multi-year training data includes pre-authentication visitor features from multiple visitor identifiers mapped to a single authenticated user identifier.

5. The method of claim 1, further comprising:
    storing the multi-year training data in an on-disk database table; and
    accessing the on-disk database table during prediction of the content recommendations.

6. The method of claim 5, further comprising:
    generating features from multi-year pre-authentication and post-authentication activities; and
    storing the features in the on-disk database table.

7. The method of claim 6, wherein generating the features comprises:
aggregating events from a plurality of visitor identifiers mapping to a single user identifier based on timestamps; and
engineering features based on a number of the events that are aggregated.

8. The method of claim 1, further comprising preparing the content recommendations for presentation on a user interface of the software subscription service.

9. The method of claim 8, wherein preparing the content recommendations comprises:
determining a display position and layout for each respective content recommendation of the content recommendations within the user interface;
allocating spaces for the content recommendations; and
preparing for rendering the content recommendations to the allocated spaces upon user access.

10. The method of claim 1, wherein the content relevance labels for pre-authentication activities and post-authentication activities indicate positive or negative indications of content relevance based on historical observed user behaviors.

11. The method of claim 10, wherein the historical observed user behaviors comprise clicks or conversions associated with previously presented content.

12. The method of claim 1, further comprising:
extracting semantic embeddings from the features; and
providing the semantic embeddings to the machine-learning model for identifying related content as additional content recommendations.

13. A system, comprising:
a memory comprising computer-executable instructions; and
a processor configured to execute the computer-executable instructions and cause the system to:
obtain multi-year training data associated with a software subscription service, the multi-year training data comprising features and content relevance labels for pre-authentication activities and post-authentication activities;
filter the multi-year training data, to generate filtered multi-year training data, based on a timestamp associated with a respective content relevance label of the content relevance labels such that each respective content relevance label is associated with features having timestamps occurring at or before the timestamp of the respective content relevance label; and
train a machine-learning model using the filtered multi-year training data to predict content recommendations based on an aggregated multi-year feature set, wherein the aggregated multi-year feature set includes features extracted from current year pre-authentication activities and post-authentication activities aggregated with historical features extracted from pre-authentication activities and post-authentication activities from prior years.

14. The system of claim 13, wherein the pre-authentication activities comprise clickstream data collected from visitor interactions with one or more websites.

15. The system of claim 13, wherein the post-authentication activities comprise user interactions with the software subscription service associated with an authenticated user account.

16. The system of claim 13, wherein the multi-year training data includes pre-authentication visitor features from multiple visitor identifiers mapped to a single authenticated user identifier.

17. The system of claim 13, wherein the processor is configured to execute the computer-executable instructions and cause the system to:
store the multi-year training data in an on-disk database table; and
make the on-disk database table available for access during prediction of the content recommendations.

18. A method for generating content recommendations in an early cycle of a software subscription service, the method comprising:
aggregating (i) real-time features extracted from current year pre-authentication activities and post-authentication activities with (ii) historical features extracted from pre-authentication activities and post-authentication activities from prior years to generate an aggregated multi-year feature set, wherein the current year pre-authentication activities comprise clickstream data collected from visitor interactions with one or more websites and the post-authentication activities comprise user interactions with the software subscription service associated with an authenticated user account; and
providing the aggregated multi-year feature set to a trained machine-learning model to predict content recommendations based on the aggregated multi-year feature set, wherein the trained machine-learning model is trained on training data including at least one of:
multi-year training data associated with the software subscription service, the multi-year training data comprising features and content relevance labels for pre-authentication activities and post-authentication activities;
filtered multi-year training data generated based on filtering the multi-year training data based on a timestamp associated with a respective content relevance label of the content relevance labels such that each respective content relevance label is associated with features having timestamps occurring at or before a timestamp of the respective content relevance label; and
predicting content recommendations based on the aggregated multi-year feature set.

19. The method of claim 18, wherein aggregating the real-time features and the historical features comprises aggregating pre-authentication visitor features from multiple visitor identifiers mapping to a single authenticated user identifier.

20. The method of claim 18, further comprising:
determining first aggregated features when a predicted content relevance is above a confidence threshold;
determining second aggregated features when the predicted content relevance is below the confidence threshold; and
causing the trained machine-learning model to be re-trained with the first and second aggregated features.

* * * * *